United States Patent
Boyer

(10) Patent No.: US 6,955,385 B1
(45) Date of Patent: Oct. 18, 2005

(54) CORROSION-RESISTANT BODY FOR UTILITY VEHICLE

(75) Inventor: Thomas J. Boyer, Wooster, OH (US)

(73) Assignee: Stahl/Scott Fetzer Company, Wooster, OH (US)

(*) Notice: Subject to any disclaimer, the term of this patent is extended or adjusted under 35 U.S.C. 154(b) by 0 days.

(21) Appl. No.: 10/821,359

(22) Filed: Apr. 9, 2004

(51) Int. Cl.$^7$ ................................................. B60N 3/12
(52) U.S. Cl. ..................................... 296/37.6; 411/361
(58) Field of Search ........................... 296/37.6, 24.45, 296/168, 37.1; 224/401, 402, 403, 404, 542, 224/42.32, 539, 543; 29/897.2, 469; 52/220.7

(56) References Cited

U.S. PATENT DOCUMENTS

| | | | |
|---|---|---|---|
| 2,530,578 A | * | 11/1950 | Hotop ........................ 296/37.6 |
| 2,531,049 A | * | 11/1950 | Huck ......................... 411/361 |
| 2,616,754 A | | 11/1952 | Stahl |
| 2,722,352 A | | 11/1955 | Dehnel |
| 2,869,919 A | | 1/1959 | Von Seggern |
| 2,978,153 A | * | 4/1961 | Brindle ....................... 296/37.6 |
| 3,068,038 A | | 12/1962 | Douglass, Jr. |
| 3,163,434 A | | 12/1964 | Krueger |
| 3,245,713 A | | 4/1966 | Ogilvie |
| 3,326,595 A | * | 6/1967 | Ogilvie ....................... 296/37.6 |
| 3,664,704 A | | 5/1972 | Ellis |
| 3,727,971 A | | 4/1973 | Sisler |
| 3,772,946 A | | 11/1973 | Sarra |
| 3,799,605 A | * | 3/1974 | Silva .......................... 296/37.6 |
| 4,126,349 A | | 11/1978 | Nelson et al. |
| 4,215,896 A | | 8/1980 | Drouin |
| 4,531,774 A | | 7/1985 | Whatley |
| 4,705,317 A | | 11/1987 | Henri |
| 4,917,430 A | | 4/1990 | Lawrence |
| 5,207,469 A | | 5/1993 | Rossi |
| 5,232,259 A | | 8/1993 | Booker |
| 5,267,773 A | | 12/1993 | Kalis, Jr. et al. |
| 5,303,969 A | | 4/1994 | Simnacher |
| 5,368,357 A | | 11/1994 | Kalis, Jr. et al. |
| 5,421,645 A | | 6/1995 | Young |
| 5,567,000 A | | 10/1996 | Clare |
| 5,617,696 A | | 4/1997 | Young |

(Continued)

OTHER PUBLICATIONS

*Hinges for construction of automobiles, utility vehicles and agricultural machines,* website printout http://www.kaltenbach-scharniere.de/html/e/sonderanfertigung/automobilbau.html, dated Mar. 26, 2004.

(Continued)

Primary Examiner—Kiran B. Patel
(74) Attorney, Agent, or Firm—Pearne & Gordon LLP

(57) ABSTRACT

A corrosion-resistant utility body comprises a pair of body side storage compartment units adapted to be mounted along rear side portions of a truck chassis. Each storage compartment unit is comprised of a storage compartment assembly that comprises metal walls forming compartments that lead to separate side openings at the outside of the storage compartment assembly. The compartments can include a plurality of vertically spaced adjustable shelves for storing equipment, tools, supplies and the like. An outer one-piece face plate is fastened to outer surfaces of the storage compartment assembly. The one-piece face plate is comprised of metal and includes door openings aligned with each of the side openings of the storage compartment assembly. Door assemblies are connected to the one-piece face plate in alignment with the door openings. A utility vehicle includes a truck chassis, a cab mounted to a front portion of the chassis, and the present utility body mounted to a rear portion of the chassis. The utility body can be constructed using swage-type fasteners and so as to be weld-free. Also featured is a method of constructing the utility body.

4 Claims, 3 Drawing Sheets

U.S. PATENT DOCUMENTS

| | | | |
|---|---|---|---|
| 5,642,845 A | | 7/1997 | Van Kooten |
| 5,769,486 A | | 6/1998 | Novoa et al. |
| 5,784,769 A | | 7/1998 | Clare |
| 5,819,390 A | | 10/1998 | Clare |
| 5,823,598 A | * | 10/1998 | Clare et al. ................. 296/37.6 |
| 5,839,775 A | * | 11/1998 | Young et al. ............... 296/37.6 |
| 5,845,952 A | | 12/1998 | Albertini et al. |
| 5,979,617 A | | 11/1999 | Clare et al. |
| 5,979,973 A | | 11/1999 | Clare et al. |
| 6,007,130 A | | 12/1999 | Clare et al. |
| 6,012,754 A | | 1/2000 | Clare et al. |
| 6,030,018 A | | 2/2000 | Clare et al. |
| 6,033,002 A | | 3/2000 | Clare et al. |
| 6,036,258 A | * | 3/2000 | Clare et al. ............ 296/187.12 |
| 6,077,012 A | * | 6/2000 | Granese et al. ............. 411/361 |
| 6,089,429 A | | 7/2000 | Everson |
| 6,089,639 A | * | 7/2000 | Wojnowski ................ 296/37.6 |
| 6,098,992 A | * | 8/2000 | Long et al. ................. 277/637 |
| 6,099,070 A | | 8/2000 | Yocum |
| 6,105,231 A | | 8/2000 | Clare et al. |
| 6,131,981 A | | 10/2000 | Finley |
| 6,142,549 A | | 11/2000 | Clare et al. |
| 6,176,540 B1 | * | 1/2001 | Whittaker .............. 296/100.02 |
| 6,237,211 B1 | * | 5/2001 | Clare et al. ................. 296/37.6 |
| 6,386,622 B1 | | 5/2002 | Grimm et al. |
| 6,422,629 B2 | * | 7/2002 | Lance et al. ............... 296/37.6 |
| 6,439,634 B1 | * | 8/2002 | Jensen et al. .............. 296/37.6 |
| 6,464,276 B1 | * | 10/2002 | Gruich ...................... 296/37.6 |
| 6,485,077 B1 | * | 11/2002 | Foster et al. ............... 296/37.6 |
| 6,499,795 B2 | | 12/2002 | Clare |
| 6,523,877 B1 | | 2/2003 | Damian |
| 6,543,829 B2 | | 4/2003 | Brown |
| 2001/0013709 A1 | | 8/2001 | Clare et al. |
| 2001/0038217 A1 | | 11/2001 | Clare et al. |
| 2001/0038218 A1 | | 11/2001 | Clare et al. |
| 2001/0038219 A1 | * | 11/2001 | Clare et al. ................. 296/37.6 |
| 2001/0038230 A1 | | 11/2001 | Clare et al. |
| 2001/0050491 A1 | | 12/2001 | Clare et al. |
| 2001/0052714 A1 | | 12/2001 | Clare |
| 2003/0071474 A1 | * | 4/2003 | Burnett ...................... 296/37.6 |
| 2003/0146638 A1 | | 8/2003 | Clare |

OTHER PUBLICATIONS

*Stahl Brochure—Grand Challenger, Service Bodies,* dated Feb. 2002.
*Service, Stake & Solid-Sides,* website printout http://www.norcom2000.com/busey/stahlline.htm, dated Oct. 27, 2003, pp 1-4.
*Actually, More is More.,* Royal Summit/Royal Truck Bodies Inc., The All-New Chevrolet Silverado with Added Features and Styling Brochure, dated 2001.
*Side-view of Royal's prior art design, showing hinged outer side panel opening upward to expose storage compartment underneath, Fig 4.*
*Side-view of Royal's prior art design, showing hinged outer side panel that could open upward to expose storage compartment underneath, Fig 6.*
*GM's prior art design,* also showing hinged outer side panel opening upward to expost storage compartment underneath, Fig 2., date unknown.
*Ford's prior art design,* also showing hinged outer side panel opening downward to expose storage compartment underneath. date unknown.
Fig. 1 of U.S. Appl. No. 3,727,971, Fig. 1 of U.S. Appl. No. 4,705,317, Fig. 1 of U.S. Appl. No. 5,303,969, Delta Storage Box from 1991 Delta Catalog.
1991 Avalanche Storage Compartments, Avalanche Box and Delta Box.
Prototype called "Old Blue", date unknown.

* cited by examiner

CORROSION-RESISTANT BODY FOR UTILITY VEHICLE

FIELD OF THE INVENTION

The present invention relates to utility vehicles and, in particular, to utility bodies that are mounted to a truck chassis of a utility vehicle.

BACKGROUND OF THE INVENTION

Utility vehicles include utility bodies mounted to the rear of the chassis of vehicles. The utility bodies have a plurality of storage compartments covered by exterior doors. Utility vehicles are used by companies that have a need for storage, such as telephone companies, electric companies, general contractors, repair companies and the like.

Utility bodies are mounted onto an OEM truck chassis with a cab and no bed. The utility body is mounted onto the rear portion of the chassis in place of the bed. The utility body is provided with a style and color that complement the cab. Utility bodies for such vehicles can have various designs with different numbers, sizes and locations of compartments. Utility bodies typically comprise a pair of body side storage compartment units mounted along rear side portions of the chassis.

Problems can arise in utility vehicles as a result of the manner or materials used in their construction. Typically, the storage compartments of utility bodies are made of metal and comprised of various front, rear, top, bottom and other panels that are interconnected by welding. While welding provides the utility body with desired strength, finishing of the welds removes a corrosion-resistant zinc coating on the metal, exposing the metal to corrosion. Another potential problem with welding is that the location of the welds, though specified by the utility body manufacturer to maximize strength, may not always be made in the specified locations. This could lead to reduced strength of welded utility bodies.

Another issue in conventional construction of utility bodies is the need to square compartments and doors. That is, the utility body's various panels must be square so that the compartments they form and the doors that cover them are properly aligned and square. This requires the use of fixtures for aligning the panels square during welding.

Utility vehicles could benefit from a construction that reduces corrosion, improves the high strength reliability of the utility bodies, and simplifies fabrication.

SUMMARY OF THE INVENTION

In general, a utility vehicle constructed according to the present invention comprises a truck chassis without a bed, a cab disposed at a front portion of the chassis, and the inventive corrosion-resistant utility body disposed at a rear portion of the chassis. The corrosion-resistant utility body comprises a pair of body side storage compartment units adapted to be mounted along rear side portions of the truck chassis. Each storage compartment unit is comprised of a storage compartment assembly that comprises metal walls forming compartments that lead to separate side openings at the outside of the storage compartment assembly. The compartments can include a plurality of vertically spaced adjustable shelves for storing equipment, tools, supplies and the like. An outer one-piece face plate is fastened to outer surfaces of the storage compartment assembly. The one-piece face plate is comprised of metal and includes door openings aligned with the side openings of the storage compartment assembly. Door assemblies are connected to the one-piece face plate in alignment with the door openings.

Swage-type engineered fasteners are preferably used in the construction of the utility body. The storage compartment assembly includes pairs of contiguous storage compartment walls including one wall having a surface including a pre-cut hole therein (surface hole) and another wall having a flange including a pre-cut hole therein (flange hole). The flange hole and the surface hole are aligned with each other. Each of the fasteners comprises a head that contacts an outer one of the walls. A shank extends from the head through the aligned pre-cut holes and comprises a plurality of lock grooves. A tubular collar has an interior portion swaged into the lock grooves into contact with an inner surface of the other of the walls effective to clamp the flange and the surface together.

A preferred embodiment of the present invention features the corrosion-resistant utility body for mounting onto a truck chassis comprising a pair of the body side storage compartment units comprising the metal walls forming the compartments that lead to separate side openings. The storage compartment units are adapted to be mounted generally parallel to each other onto rear side portions of a truck chassis. Each unit is comprised of a storage compartment assembly of metal panels and sections comprising: side wall panels extending generally vertically, an upper panel extending generally horizontally over the side wall panels, a back section extending generally vertically and lower sections extending between the side wall panels. The panels and sections are constructed and arranged relative to one another to form the storage compartment assemblies including the side openings. A periphery of some of the panels and sections include flanges in which flange holes are pre-cut and a periphery of other panels and sections are without flanges in which surface holes are pre-cut. The flange holes are aligned with the surface holes on contiguous panels and sections. Also included is a pair of one-piece face plates comprised of metal. Each of the one-piece face plates includes door openings aligned with each of the side openings of the respective storage compartment assembly. Each of the one-piece face plates further includes pre-cut holes that are aligned with flange-holes on flanges of the panels and sections on an outer surface of the respective storage compartment assembly. Engineered fasteners connect each one-piece face plate to the flanges of the panels and sections on the outer surface of the respective storage compartment assembly. Fasteners also connect together the panels and sections. The fasteners connect contiguous pairs of members selected from the group consisting of the face plate and the panels and sections. Each of the fasteners comprises a head that contacts an outer surface of one of the members. A shank extends from the head through the aligned pre-cut holes in the members and has a plurality of lock grooves. A tubular collar has an interior portion swaged into the lock grooves into contact with an inner surface of a flange of the other member effective to clamp together the contiguous pairs of members. Door assemblies are connected to the one-piece face plates in alignment with the door openings. The utility body side storage compartments thus constructed, are weld-free.

In the utility body, a tailgate is connected between the storage compartments in a known manner. A bulkhead is fastened at the front of the storage compartments in a known manner. A utility vehicle of the invention comprises a truck chassis, a cab mounted to a front portion of the chassis, and the inventive utility body mounted to a rear portion of the chassis in a known manner.

A method of constructing the corrosion-resistant utility body for mounting to a truck chassis, comprises providing the body side storage compartment units having compartments that lead to separate side openings. The storage compartment units are adapted to be mounted along rear side portions of a frame of a truck chassis. Each unit is comprised of a storage compartment assembly of metal panels and sections comprising: the side wall panels constructed and arranged to extend generally vertically; the upper section constructed and arranged to extend generally horizontally over the side wall panels, the rear section constructed and arranged to extend generally vertically, and the lower sections constructed and arranged to extend between the side wall sections. The metal one-piece face plate is constructed and arranged to be disposed on outer surfaces of the storage compartment assembly and to include door openings aligned with each of the side openings on the storage compartment assembly. The one-piece face plate includes a plurality of pre-cut holes. Each of the panels and sections includes flanges around a periphery thereof that extend generally horizontally or vertically. The flanges include pre-cut flange-holes. A periphery of some panels includes pre-cut surface holes that are not located on a flange. The flange holes in outer flanges of the plates and sections are aligned with the holes of the one-piece face plate. The panels and sections are positioned to align the flange holes with the surface holes in contiguous panels and sections. Contiguous pairs of members selected from the group consisting of the face plate and the panels and sections, are interconnected using a plurality of swage-type fasteners. A fastening step during interconnection comprises inserting a shank of the fastener through the aligned pre-cut holes in the members until a head of the fastener contacts an outer surface of one of the members. The shank comprises a plurality of lock grooves. A tubular collar is inserted onto the shank. An interior portion of the collar is swaged into the lock grooves into contact with an inner surface of a flange of the other one of the members effective to clamp together the contiguous pairs of the members and construct the body side storage compartments weld-free. Door assemblies are connected to each of the one-piece face plates in alignment with the door openings.

The utility body constructed according to the present invention provides many advantages compared to conventional utility bodies. The problem of corrosion that arises upon finishing down welds in conventional utility bodies is avoided by the present weld-free construction. Also, the risk that welds will not be located in positions that maximize strength according to specification is avoided by using pre-cut holes for locating the fasteners. This improves the reliability and the strength of the inventive utility body. The present use of swage-type fasteners is believed to be novel in the field of utility bodies mounted to truck chassis and provides a permanent locking connection between the contiguous sections, panels and one-piece face plate that effectively resists vibration and offers an aesthetically pleasing appearance.

Another advantage arises from the use of the one-piece face plate. Because the one-piece face plate covers the entire side of the storage compartments and aligns its door openings with the side openings of the storage compartment assembly, it simplifies construction. The outer flanges of the panels and sections are fastened to the one-piece face plate through the aligned pre-cut flange and surface holes. The one-piece face plate thus provides a self-fixturing construction that enables the panels and sections of the storage assembly to be aligned precisely without welds or fixtures. This consistently results in precisely square compartments and doors.

Many additional features, advantages and a fuller understanding of the invention will be had from the following description of the drawings and detailed description that follows.

DETAILED DESCRIPTION

Figure 1:
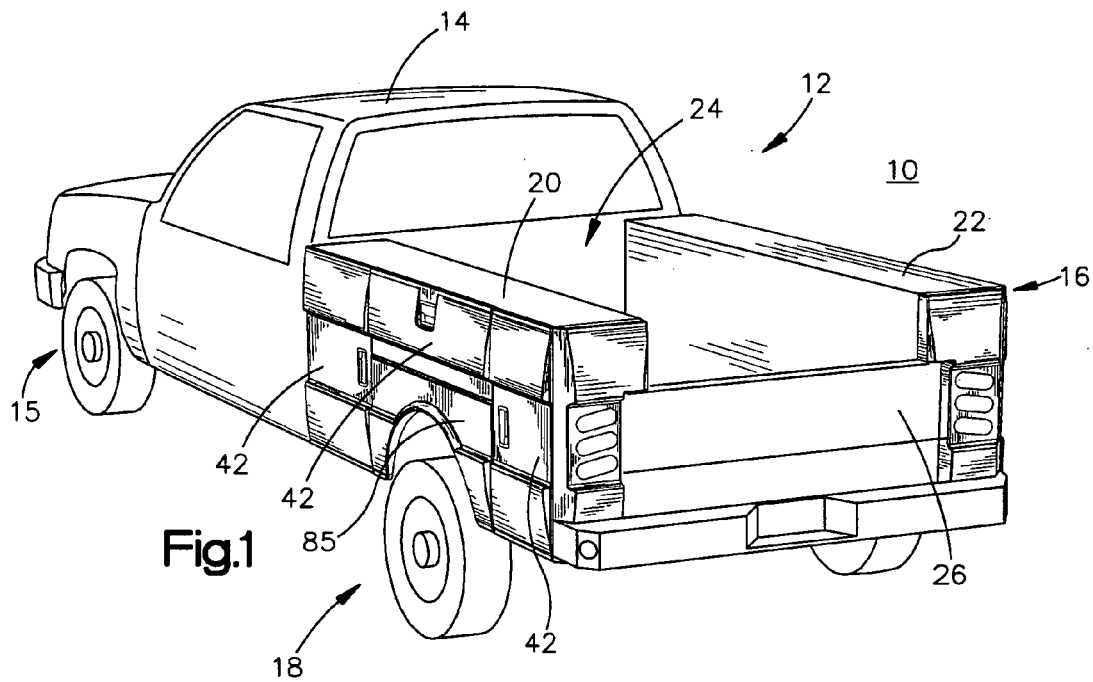
FIG. 1 is an elevational view of a utility vehicle including a utility body having storage compartment units, which is constructed according to the present invention.
Figure 1A:
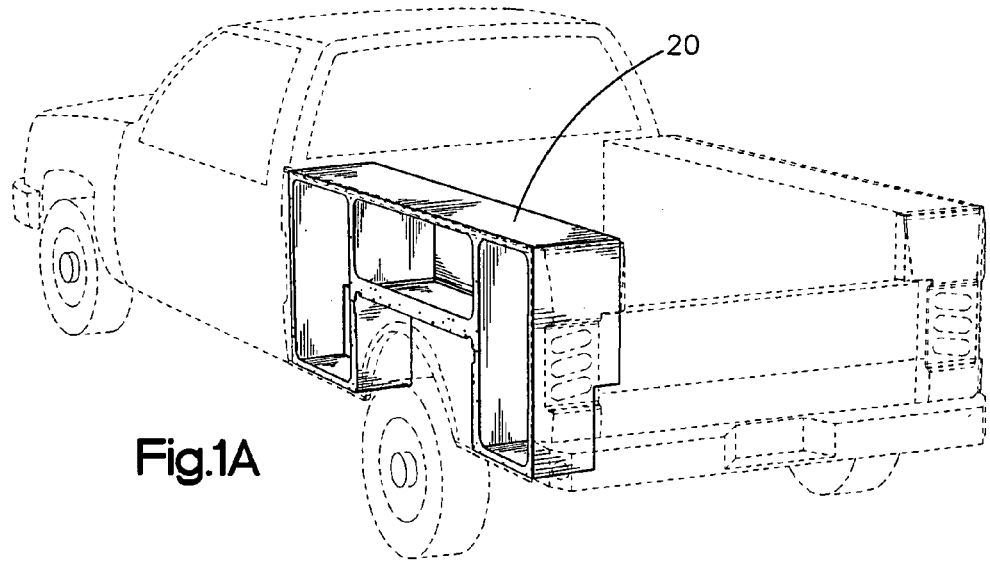
FIG. 1A is an elevational view showing a storage compartment unit of the utility body shown in FIG. 1 without doors.

A utility vehicle 10 constructed according to the present invention comprises a truck chassis 12 without a bed, a cab 14 disposed at a front portion 15 of the chassis, and the inventive corrosion-resistant utility body 16 disposed at a rear portion 18 of the chassis. The corrosion-resistant utility body comprises a pair of body side storage compartment units 20, 22 adapted to be mounted along rear side portions of the truck chassis. Only one storage compartment unit 20 will be described in detail herein, the other storage compartment unit 22 being a mirror image thereof but otherwise preferably having the same features. The front of the storage compartment units are mounted to a bulkhead 24 near the cab. A tailgate 26 is mounted to the rear of the storage compartment units.

Figure 2:
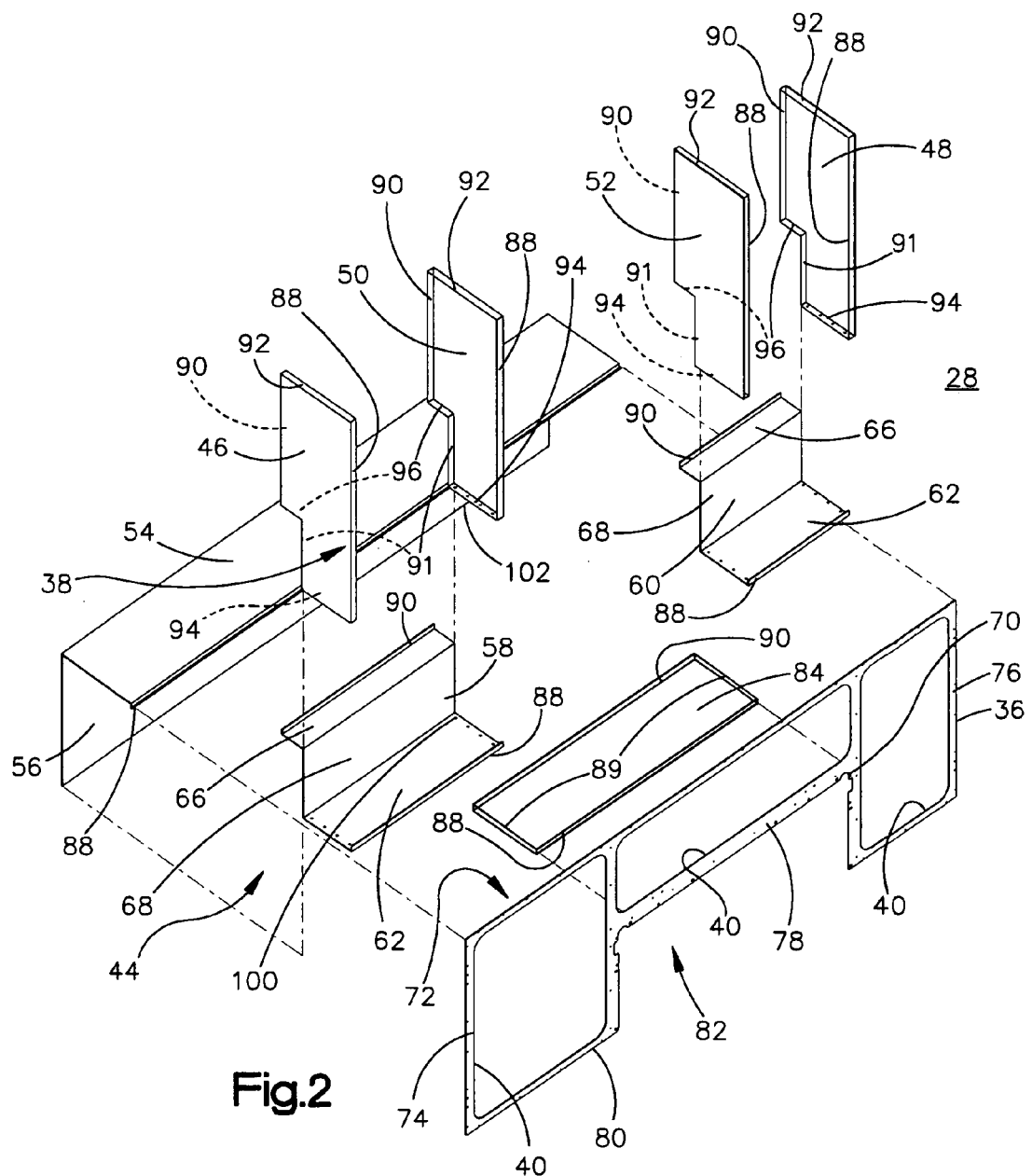
FIG. 2 is an exploded view of one of the storage compartment units.
Figure 3:
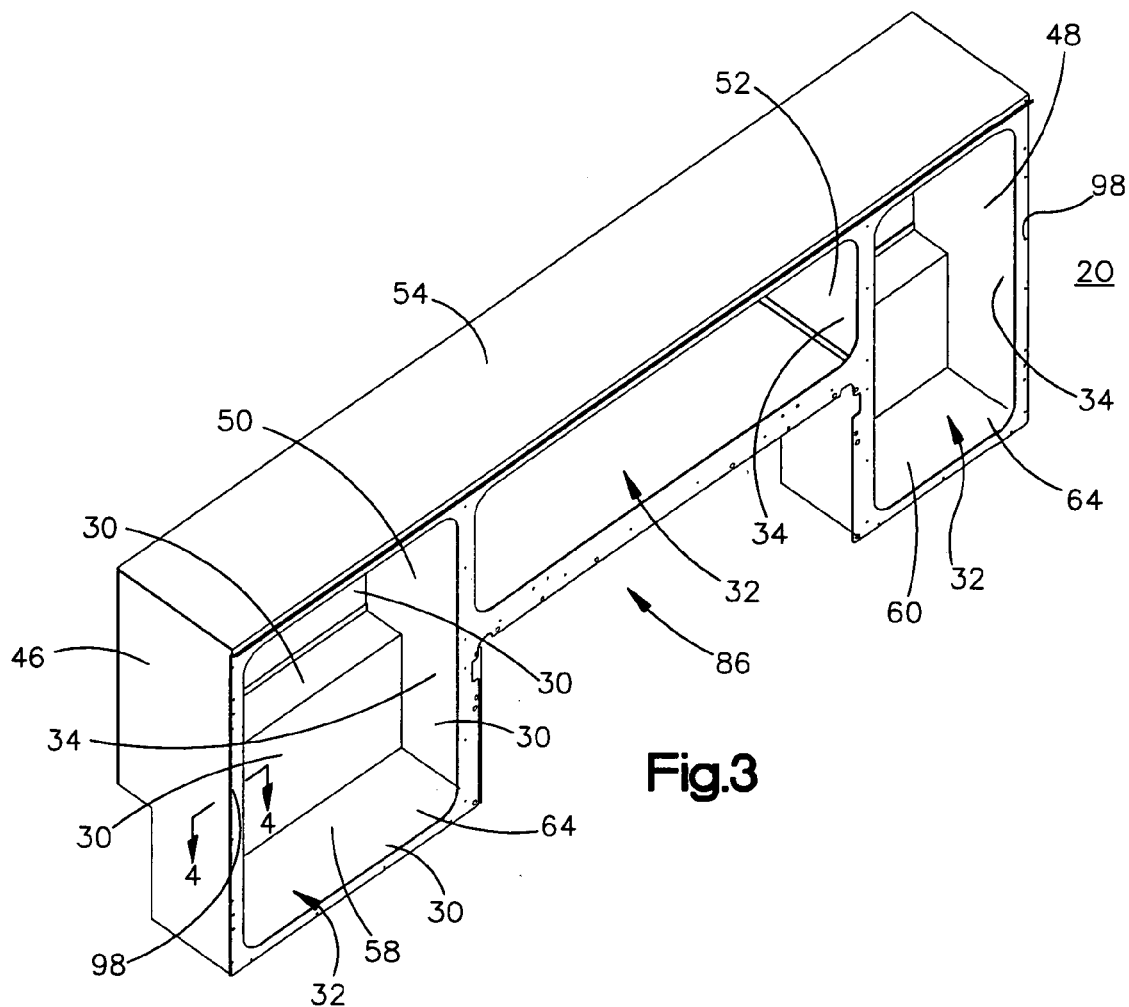
FIG. 3 is an elevational view of one of the storage compartment unit shown in FIG. 1.

Each storage compartment unit 20, 22 is comprised of a storage compartment assembly. The storage compartment assembly 28 of the unit 20 (FIGS. 2 and 3) comprises metal walls 30 (a few of which are labeled) forming compartments 32 that lead to separate side openings 34 at the outside of the storage compartment assembly. An outer one-piece face plate 36 is fastened to the storage compartment assembly. The compartments can include a plurality of vertically spaced, adjustable shelves for storing equipment, tools, supplies and the like. The one-piece face plate 36 is fastened to outer surfaces 38 of the storage compartment assembly 28. The one-piece face plate is comprised of metal and includes door openings 40 aligned with the side openings 34 of the storage compartment assembly. Door assemblies 42 are connected to the one-piece face plate in alignment with the door openings. Suitable door assemblies for use in the inventive utility bodies are disclosed in the pending application, entitled "Hidden Hinge for Utility Vehicle Body" filed on Apr. 9, 2004, which is incorporated herein by reference in its entirety.

The storage compartment assembly 28 includes a plurality of panels and sections 44, including the following side wall sections or panels extending generally vertically: a front side wall panel 46 located near the front of the truck, a rear side wall panel 48 located near the rear of the truck, and front and rear intermediate panels 50, 52, respectively, located between the front and rear side wall panels. An upper section 54 extends generally horizontally over the side wall panels. The upper section may be integrally formed with a partial back section 56, which extends generally vertically. The upper and back sections 54, 56 may extend at approximately 90 degree angles relative to each other.

The storage compartment assembly also includes a pair of lower sections: a front, lower section 58 located between the front side wall panel 46 and the front intermediate side wall panel 50; and a rear, lower section 60 located between the rear side wall panel 48 and the rear intermediate side wall panel 52. In the preferred design shown, the lower sections 58, 60 each include a lower, generally horizontally extending surface 62 that forms a bottom surface 64 of the front and rear compartments, a generally horizontally extending shelf portion 66 that can be mounted onto a structural frame of the vehicle and a generally vertically extending connecting surface 68 extending between the shelf 66 and the lower surface 62.

The one-piece face plate 36 includes inner and outer surfaces 70, 72, front and rear portions 74, 76 and a central portion 78 extending between the front and rear portions. The central portion is elevated from the bottom of the one-piece face panel 80 and, along with edges of the front and rear portions of the one-piece face plate, form a wheel well opening 82. The door openings 40 formed in the one-piece face plate are located at the front and rear portions 74, 76 and at the central portion 78. The door openings are configured and arranged to be aligned with each corresponding side opening 34 of the storage compartment unit. The one-piece face plate completely covers the side of the storage compartment assembly and all of the side openings 34. A central bottom panel 84 is disposed at the bottom of the central portion of the one-piece face plate.

A wheel well 86 is formed in each storage compartment unit. The opening 82 of the one-piece face plate forms a front edge of the wheel well. The sides of the wheel well are comprised of the inner surfaces of the front and rear intermediate panels 50, 52. The top of the wheel well is formed by a lower surface of the central bottom panel 84. The front of the wheel well is formed by a fender 85 fastened to the central portion. The doors and fender can be formed of ABS plastic.

Each of the panels and sections of the compartment units includes flanges that extend generally vertically and/or horizontally. In a preferred embodiment, the front and front intermediate panels and the rear and rear intermediate panels include flanges around their peripheries that extend toward one another. Vertical outer flanges 88 are disposed on the following: the front and rear side wall panels, the front and rear intermediate panels, the front and rear lower sections, the upper section and the central panel. The central panel also includes vertical side flanges 89. Vertical inner flanges 90 are disposed on the following: the front and rear side wall panels, the front and rear intermediate panels, the shelf sections of the front and rear lower sections, and the central panel. Intermediate vertical flanges 91 are disposed on the following: the front and rear side wall panels and the front and rear intermediate panels. Upper horizontal flanges 92 and lower horizontal flanges 94 are disposed on the following: the front and rear side wall panels and the front and rear intermediate panels. Intermediate horizontal flanges 96 are disposed on the following: the front and rear side wall panels and the front and rear intermediate panels. The panels, sections and one-piece face plate are formed of metal, one preferred type being galvanneal steel.

During construction of the storage units, the components of the storage compartment assembly are positioned so as to be capable of forming the side openings 34 and storage compartments 32. The front and rear side wall panels and the front and rear intermediate panels are arranged to extend generally vertically. The upper section is arranged to extend generally horizontally over the side wall panels and the back section extends generally vertically at a back of the storage compartment assembly. The lower sections are arranged to extend between the side wall sections. The metal one-piece face plate is arranged to be disposed on an outer surface of the storage compartment assembly and to align the door openings 40 with each of the side openings 34 of the storage compartment assembly.

The one-piece face plate includes a plurality of pre-cut holes 98 (FIG. 3) located therein. Peripheries of some panels (e.g., lower horizontal surface 62) include pre-cut surface holes 100 (or holes 98) that are not located on a flange. The flanges (e.g., flanges 94) have pre-cut flange-holes 102 formed therein. The panels, sections and one-piece face plate are engineered such that the locations of the flange holes 102 and surface holes 100 are predetermined to maximize the strength of the storage compartment unit. The storage compartment units can also be constructed by drilling holes in the corresponding flanges and surfaces during construction, instead of using pre-cut holes.

The one-piece face plate and contiguous panels and sections are positioned relative to each other to align the pre-cut holes in the outer flanges of the panels and sections 88 with the corresponding pre-cut holes 98 of the one-piece face plates. In constructing the storage compartment assembly, the panels and sections are positioned effective to align all of the flange-holes and surface holes of contiguous panels and sections (e.g., flange holes 102 with surface holes 100).

More specifically, the outer vertical flanges 88 of the following: the front and rear side wall panels, the front and rear intermediate panels, the lower surfaces of the front and rear lower sections, the central bottom panel and the upper section, are positioned to align pre-cut holes in the flanges with corresponding pre-cut holes 98 in the one-piece face plate. The inner, vertical flanges 90 of the following: the front and rear side wall panels, the front and rear intermediate panels, the shelf surfaces of the front and rear lower sections, and the central bottom panel, are positioned to align pre-cut holes in the flanges of these panels with corresponding pre-cut holes in the back surface 56. The lower horizontal flanges 94 of the following: the front and rear side wall panels and the front and rear intermediate panels, are positioned to align pre-cut holes in the flanges of these panels with corresponding pre-cut holes in the lower surfaces 62 of the front and rear lower sections. The intermediate horizontal flanges 96 of the following: the front and rear side wall panels and the front and rear intermediate panels, are positioned to align pre-cut holes in the flanges of these panels with corresponding pre-cut holes in the shelf sections 66 of the front and rear lower sections. The intermediate vertical flanges 91 of the following: the front and rear side wall panels, and the front and rear intermediate panels, are positioned to align pre-cut holes in the flanges of these panels with corresponding pre-cut holes in the connecting sections of the front and rear lower sections. The upper horizontal flanges 92 of the following: the front and rear side wall panels and the front and rear intermediate panels, are positioned to align pre-cut holes in the flanges of these panels with corresponding pre-cut holes in the upper section.

Figure 4:
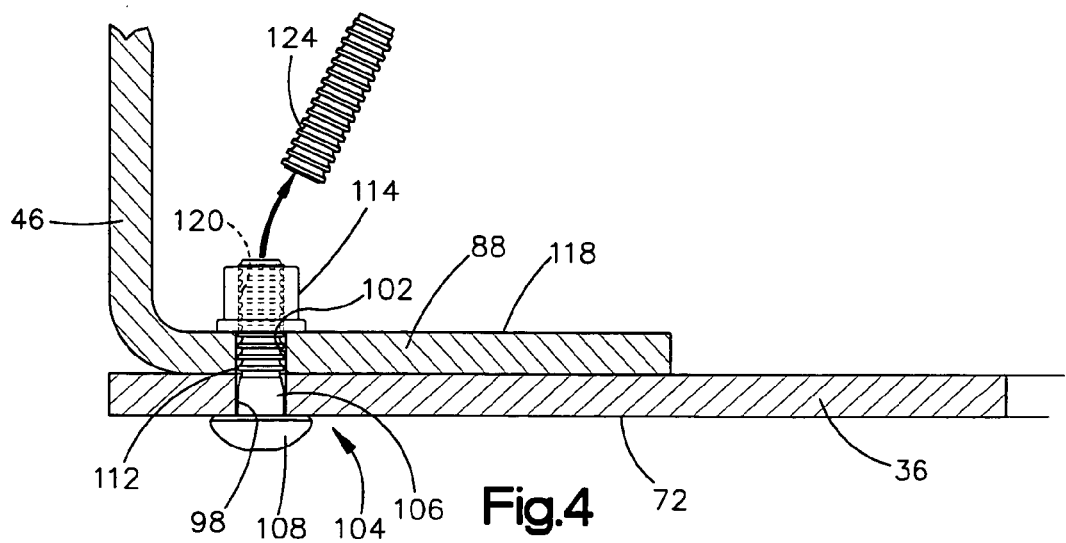
FIG. 4 is a cross-sectional view as seen along lines and arrows 4—4 in FIG. 3.

Fasteners interconnect the front and rear side wall panels, the front and rear intermediate panels, the upper section (with back section), the central panel, the lower sections and the one-piece face plate together. Preferred fasteners are swage-type fasteners. The swage-type fasteners may be of the pull type or stump type as known in the art. One preferred fastener is a MagnaGrip® LockBolt™ manufactured by the Huck company, which is generally shown in FIG. 4. Different types of swage-type fasteners manufactured by the Huck company (or others) and disclosed in the Huck company's catalogues and website may also be suitable for use in the present invention. The Huck company's catalogues and website are incorporated herein by reference in their entireties. Those skilled in the art in reading this disclosure will appreciate the specific features of swage-type fasteners, variations of swage-type fasteners, materials of swage-type fasteners, and installation procedure, which are suitable for use in the present invention. Other fasteners such as rivets, and bolts with lock nuts may be suitable for use, but might not be able to resist vibration as well as the inventive use of swage-type fasteners in utility bodies mounted to truck chassis.

Contiguous pairs of members of a group consisting of the face plate, and panels and sections of the storage compartment units, are interconnected using a plurality of swage-type fasteners 104, using a conventional swage fastener installation tool, such as the installation tool provided by the Huck company for use with MagnaGrip® LockBolt™, as described on the Huck company's website and catalogue. Because the installation of fasteners is conducted in the same manner for all of the contiguous pairs of sections, panels and one-piece face plate, the following installation procedure described with regard to the one-piece face plate and front side wall panel 46, applies to the installation of all of the fasteners in all of the sections, panels and one-piece face plate. A shank or pin 106 of the fastener is inserted through the aligned pre-cut surface hole 98 in the one-piece face plate 36 and flange hole 102 in the flange 88 of the front side wall panel 46, until a head 108 of the fastener contacts the outer surface 72 of the one-piece face plate 36, as shown in FIG. 4. The shank 106 comprises a plurality of lock grooves 112. A tubular collar 114 is inserted onto the shank 106 until the collar contacts the inner surface of the outer vertical flange 88 of the front side wall panel 46, as shown in FIG. 4. The installation tool is applied from the inside of the storage compartment assembly when conducting the swaging operation. An interior portion 120 of the collar 114 is swaged by the installation tool onto the lock grooves 112 into contact with the inner surface of the flange 88, effective to clamp together the contiguous one-piece face plate 36 and the front side wall panel 46 at the location shown. Once the one-piece face plate and front side wall have been clamped together at that location by the swaging action under a suitable clamping force, a free end portion 124 of the shank 106 beyond the collar is broken off in a known manner. This process is repeated for installation of all the fasteners in the one-piece face plate, panels and sections. The utility body storage compartment unit thus formed, has a weld-free construction.

Because the one-piece face plate and pre-cut holes are employed, and because contiguous sections and panels are connected to the one-piece face plate, the panels and sections are square with one another, and the compartments and door openings are square, without the need for external fixtures. Therefore, the one-piece face plate provides a self-fixturing construction of the utility body. The door assemblies are connected to the one-piece face plates in alignment with the square door openings.

It will be appreciated that the present invention contemplates using panels and sections having different geometrical shapes than the panels and sections shown in the drawings and different relative connections among the panels of the storage compartments. Those skilled in the art will also appreciate that the compartments and doors may be formed in different sizes, shapes and locations, and different numbers of compartments may be used, without departing from the spirit and scope of the present invention. The present invention contemplates assembling the face plate, panels and sections in a different order. However, an advantage of the invention is use of the one-piece face plate for self-fixturing construction of the storage compartments. Other fixtures are not needed for achieving square alignment of the compartments and door assemblies. The present assembly method benefits from the use of the one-piece face plate having pre-cut openings and from pre-cut openings in the flanges and surfaces of the other panels and sections, for positioning the fasteners in predetermined locations that maximize the strength and reliability of the utility body.

Many modifications and variations of the invention will be apparent to those of ordinary skill in the art in light of the foregoing disclosure. Therefore, it is to be understood that, within the scope of the appended claims, the invention can be practiced otherwise than has been specifically shown and described.

What is claimed is:

1. A corrosion-resistant utility body for mounting onto a truck chassis, comprising a pair of body side storage compartment units mounted along rear side portions of the truck chassis, each of said units comprising:
   a storage compartment assembly of metal walls forming compartments that lead to separate side openings;
   a one-piece face plate comprised of metal including door openings aligned with each of said side openings of said respective storage compartment assembly;
   fasteners that connect each said one-piece face plate to an outer surface of a respective said storage compartment assembly; and
   door assemblies connected to said one-piece face plate in alignment with said door openings;
   wherein said body side storage compartment units are weld-free.

2. The utility body of claim 1 wherein a pair of contiguous said walls includes one wall including a pre-cut hole therein and another wall having a flange including a pre-cut hole therein, said pre-cut hole of said flange and said pre-cut hole of said surface being aligned, each of said fasteners comprising a head that contacts an outer one of said walls, a shank comprising a plurality of lock grooves extending from said head through said aligned pre-cut holes, and a tubular collar that has an interior portion swaged into said lock grooves into contact with an inner surface of the other of said walls effective to clamp said walls together.

3. A corrosion-resistant utility body for mounting onto a truck chassis comprising a pair of body side storage compartment units mounted generally parallel to each other onto rear side portions of the truck chassis, each of said units comprising:
   a storage compartment assembly of metal panels and sections forming compartments that lead to separate side openings, said storage compartment assembly comprising side wall panels extending generally vertically, an upper panel extending generally horizontally over said side wall panels, a back section extending generally vertically and lower sections extending between said side wall panels, said panels and sections being constructed and arranged relative to one another to form said storage compartment assembly including said side openings, wherein a periphery of some of said panels and sections include flanges in which flange holes are pre-cut and a periphery of others of said panels and sections are without flanges in which surface holes are pre-cut, said flange holes being aligned with said surface holes on contiguous said panels and sections;

a one-piece face plate comprised of metal including door openings aligned with each of said side openings of said respective storage compartment assembly, said one-piece face plate further including pre-cut holes that are aligned with flange-holes on flanges of said panels and sections on an outer surface of said respective storage compartment assembly;

fasteners that connect each said one-piece face plate to said flanges of said panels and sections on the outer surface of said respective said storage compartment assembly and connect together said panels and sections, said fasteners connecting contiguous pairs of members selected from the group consisting of said face plate and said panels and sections, each of said fasteners comprising a head that contacts an outer surface of one of the members, a shank comprising a plurality of lock grooves extending from said head through said aligned pre-cut holes in said members, and a tubular collar that has an interior portion swaged into said lock grooves into contact with an inner surface of a flange of the other one of the members effective to clamp together the contiguous pairs of the members; and door assemblies connected to said one-piece face plate in alignment with said door openings;

wherein said body side storage compartment units are weld-free.

4. A method of constructing a corrosion-resistant utility body for mounting to a truck chassis, comprising the steps of:

providing body side storage compartment units adapted to be mounted along rear side portions of a truck chassis, each said unit being comprised of:

a storage compartment assembly of metal panels and sections forming compartments that lead to separate side openings, said storage compartment assembly comprising: side wall panels constructed and arranged to extend generally vertically; an upper section constructed and arranged to extend generally horizontally over said side wall panels, a rear section constructed and arranged to extend generally vertically, lower sections constructed and arranged to extend between said side wall sections; and a metal one-piece face plate constructed and arranged to be disposed on outer surfaces of said storage compartment assembly and to include door openings aligned with each of said side openings on said storage compartment assembly, wherein said one-piece face plate includes a plurality of pre-cut holes, and each of said panels and sections includes flanges around a periphery thereof that extend generally horizontally or vertically, a periphery of some panels including surface holes that are not located on a flange and said flanges including flange-holes formed therein;

positioning said one-piece face plate to align flange holes in outer flanges of said plates and sections with said pre-cut holes of said one-piece face plate;

positioning said panels and sections to align said flange holes with said surface holes in contiguous said panels and sections;

interconnecting contiguous pairs of members selected from the group consisting of said face plate and said panels and sections, using a plurality of swage-type fasteners, a fastening step during interconnection comprising: inserting a shank of said fastener through said aligned pre-cut holes in said members until a head of said fastener contacts an outer surface of one of the members, said shank comprising a plurality of lock grooves, inserting a tubular collar onto said shank and swaging an interior portion of said collar into said lock grooves into contact with an inner surface of a flange of the other one of the members effective to clamp together the contiguous pairs of the members and construct said body side storage compartment units weld-free; and connecting door assemblies to each of said one-piece face plates in alignment with said door openings.

* * * * *